United States Patent [19]

Poulin

[11] Patent Number: 4,461,458
[45] Date of Patent: Jul. 24, 1984

[54] LOW EFFORT DIGGING AND LIFTING TOOL

[76] Inventor: Charlemagne Poulin, 1432 Defense Hwy., Gambrills, Md. 21054

[21] Appl. No.: 448,315

[22] Filed: Dec. 9, 1982

[51] Int. Cl.³ .............................................. A01B 1/02
[52] U.S. Cl. ................................. 254/131.5; 294/59
[58] Field of Search ................. 294/54.5, 58, 59; 37/265, 285; 254/131.5

[56] References Cited

U.S. PATENT DOCUMENTS

| 2,269,119 | 1/1942 | Mason | 254/131.5 |
| 2,419,015 | 4/1947 | Gascoigne et al. | 254/131.5 |

FOREIGN PATENT DOCUMENTS

| 1067629 | 10/1959 | Fed. Rep. of Germany | 294/59 |
| 946914 | 6/1949 | France | 254/131.5 |
| 449628 | 6/1949 | Italy | 294/59 |
| 337352 | 5/1959 | Switzerland | 254/131.5 |
| 547775 | 9/1942 | United Kingdom | 254/131.5 |

Primary Examiner—Johnny D. Cherry
Attorney, Agent, or Firm—Brady, O'Boyle & Gates

[57] ABSTRACT

A shovel or spade for digging and lifting with minimal effort by the user reacts against the ground during use through a flat foot plate having a forward end cleat which penetrates the ground to resist rearward displacement of the foot plate. The foot plate near its forward end is connected to the shovel or spade handle shaft near and above the blade of the tool by a rigid link whose opposite ends are pivotally connected with the foot plate and handle shaft on parallel pivot axes across the foot plate and across the axis of the handle shaft. The tool can be operated substantially in a walking mode by the application of downward pressure on the handle shaft.

10 Claims, 11 Drawing Figures

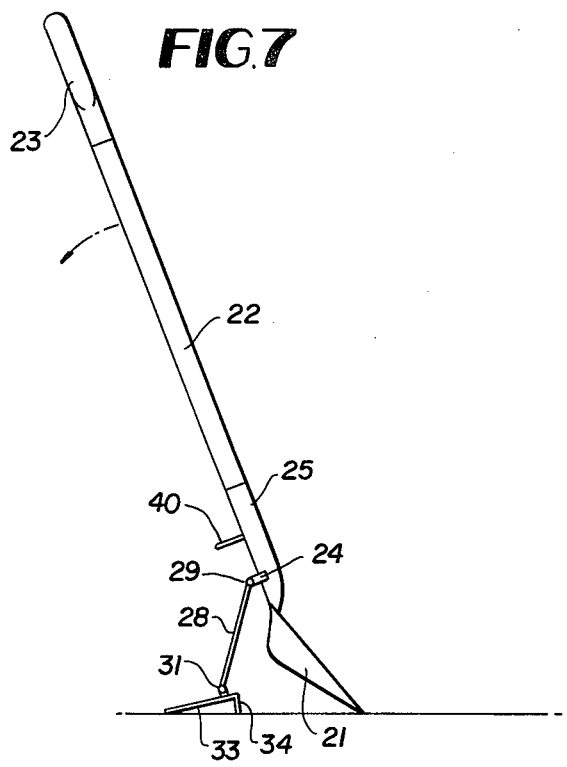
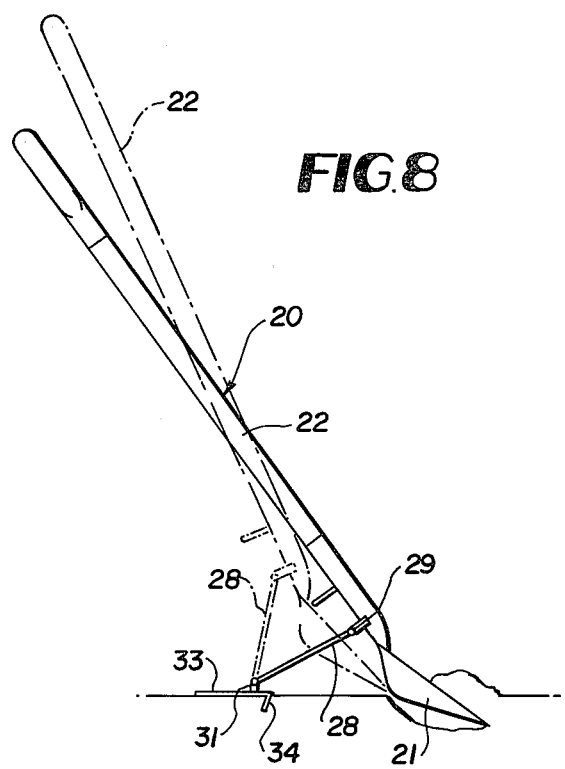
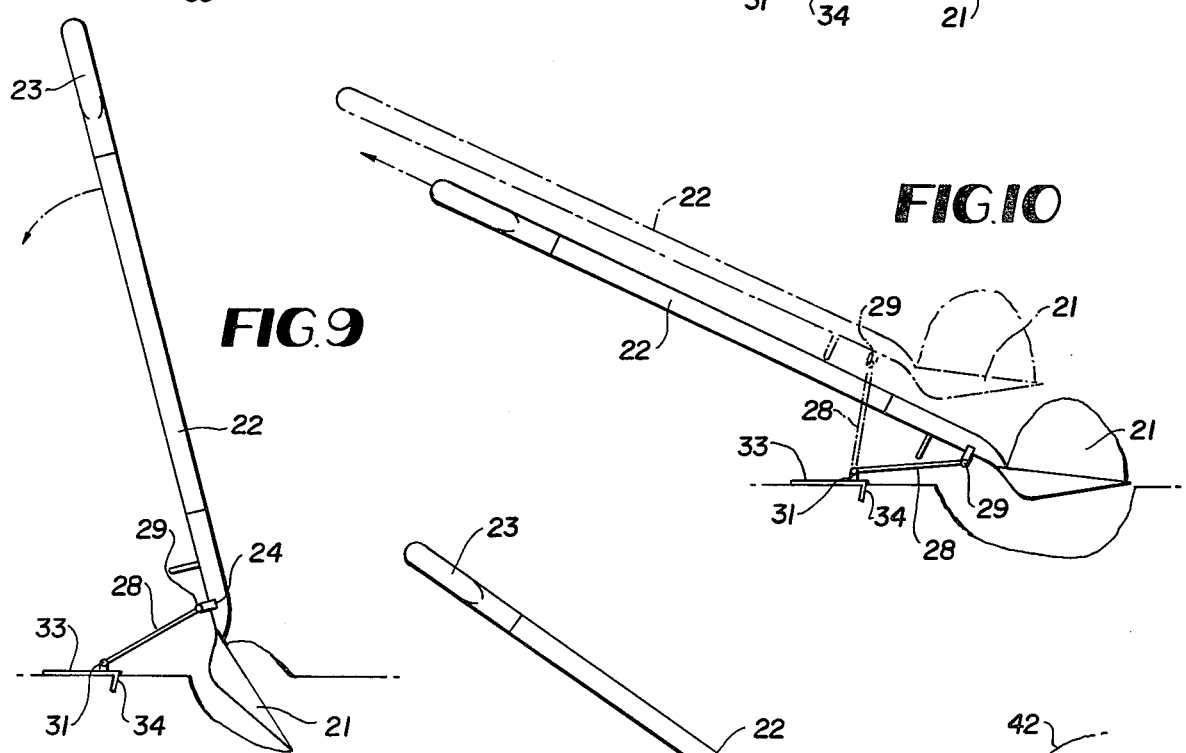
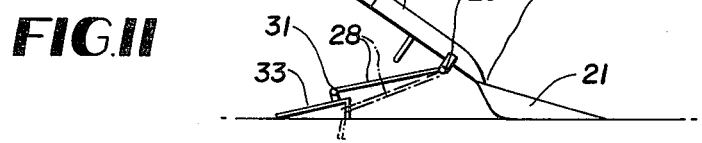

LOW EFFORT DIGGING AND LIFTING TOOL

BACKGROUND OF THE INVENTION

The prior art contains a number of teachings relating to shovels and spades which can be used for digging with reduced effort on the part of the user. The prior art devices are varied in their constructions and modes of operation. Many of the devices are impractical because of excessive manufacturing cost, complexity, bulkiness and excessive weight. In general, the prior art devices involve some form of ground-engaging attachment to a shovel or spade which provides a fulcrum on which the handle shaft may be pivoted with reduced effort to dig and lift.

The object of the present invention is to improve on the known prior art by providing a tool of the shovel or spade type having an attachment which enables the use of the tool substantially in a forwardly moving or "walking" mode for digging and lifting with greatly reduced effort by the user.

More particularly, it is an object of the invention to provide a shovel or spade attachment of the type mentioned which has an improved mode of operation compared to the prior art, and which, because of its mode of operation, is more efficient and more convenient to use than the prior art devices.

Still another object of the invention is to provide a reduced effort digging and lifting tool which is extremely simple in its construction, sturdy, lightweight and economical to manufacture.

Other features and advantages of the invention will become apparent during the course of the following detailed description.

BRIEF DESCRIPTION OF THE DRAWINGS

FIGS. 7 through 11 are side elevational views of the tool depicting its operational mode in stages.

DETAILED DESCRIPTION

Figure 1:
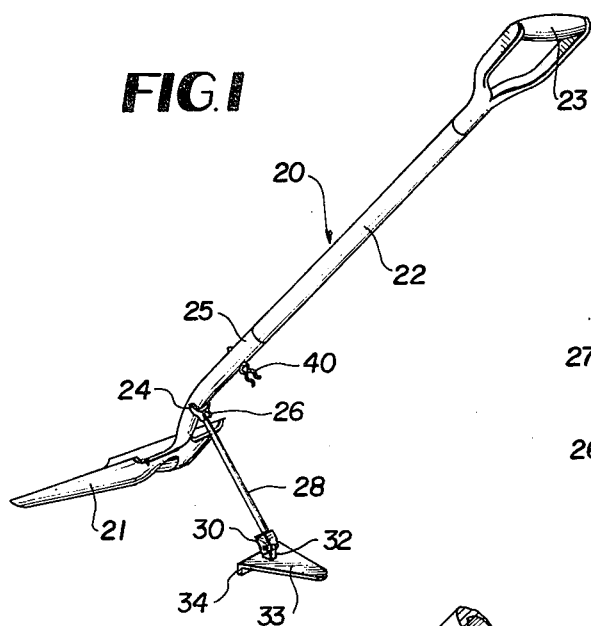
FIG. 1 is a perspective view of a shovel equipped with an effort and fatigue reducing device according to the invention.
Figure 4:
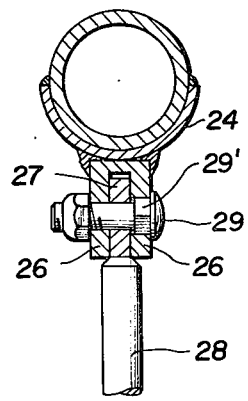
FIG. 4 is a fragmentary section taken on line 4—4 of FIG. 2.
Figure 5:
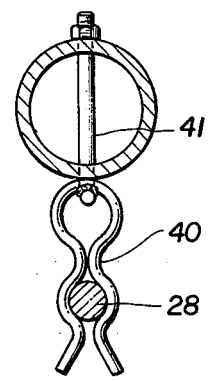
FIG. 5 is a similar section taken on line 5—5 of FIG. 2.

Referring to the drawings in detail, wherein like numerals designate like parts, a shovel 20 to which the invention is applied comprises a digging and lifting blade 21 attached securely to a handle shaft 22 which may include at its upper end a handle 23. The invention is applied to various forms of shovels and spades and is in no sense limited to the particular type of shovel illustrated in the drawings.

The device forming the main subject matter of the invention comprises an anchor 24 which may be secured by welding to the lower side of a metal sleeve 25 rising from the blade 21 into which the shaft 22 is socketed. The anchor 24 as shown in FIGS. 1 and 7-11 is located near and above the blade 21 to allow maximum leverage through the long handle shaft 22 when the tool is operated.

Figure 3:
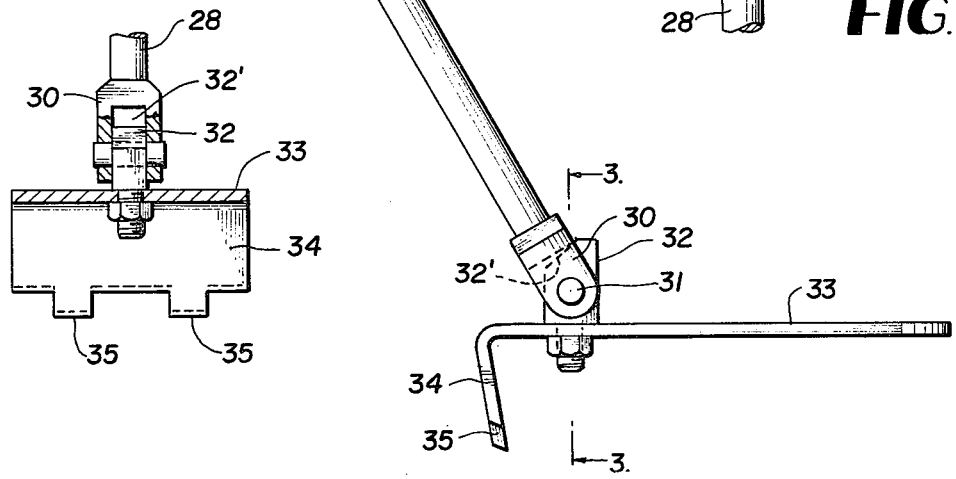
FIG. 3 is an enlarged fragmentary vertical section taken on line 3—3 of FIG. 2.

The anchor 24 carries a pair of spaced depending apertured lugs 26, rigid therewith, between which the top apertured end 27 of a rigid connecting rod 28, or link, is pivotally connected by a bolt 29, having a square shoulder 29' held in a square opening in one of the lugs 26. At its lower end, the connecting rod 28 carries a clevis 30 connected by a pivot pin 31 to an apertured lug 32 securely fixed on and rising from the top of a flat foot plate 33 near the forward end of the latter. The axes of the pivot elements 29 and 31 are parallel and transverse to the axis of handle shaft 22 of the shovel. The lug 32 has an inclined upper surface 32' forming a stop to limit swinging of the rod 28 in one direction on pivot element 31, FIG. 3.

The foot plate 33 has a downturned cleat blade 34 on its forward end slightly in advance of the pivot element 31 and this blade preferably carries two or more depending teeth 35 to enhance its ability to penetrate the soil.

Figure 6:
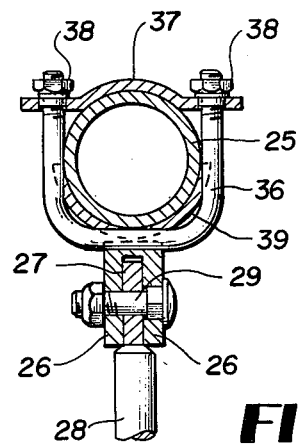
FIG. 6 is a cross section similar to FIG. 4 showing a modification.

In lieu of the welded anchor 24, a detachable yoke 36, FIG. 6, may embrace the sleeve 25 and be secured thereto by an upper clamp plate 37 held by jam nuts 38 on threaded extensions of the yoke. The previously-described connecting rod 28 is then pivotally connected through shoulder bolt 29 to the apertured lugs 26 of a curved rest plate 39 which clampingly engages the bottom of sleeve 25 but is not permanently fixed thereto. The arrangement in FIG. 6 allows the effort and fatigue reducing device to be attached to or removed from a shovel or spade at will, rather than being a permanent attachment.

Figure 2:
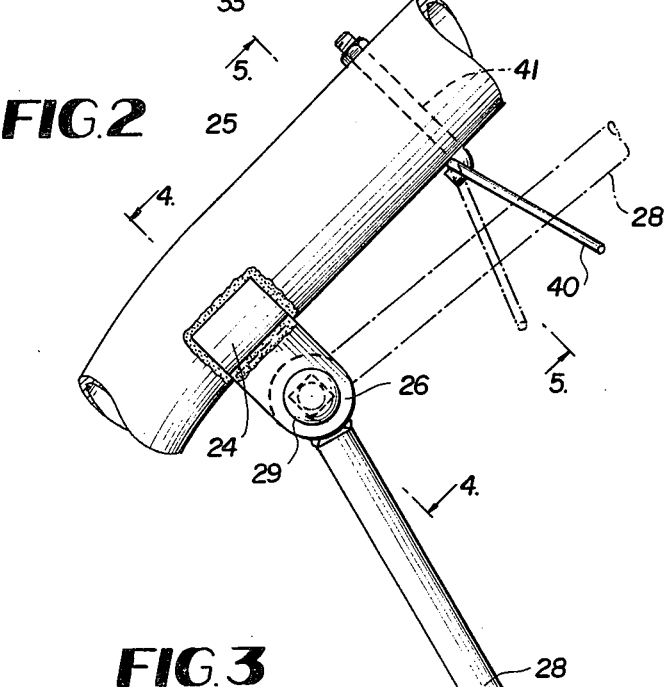
FIG. 2 is an enlarged fragmentary side elevation of the device.

A further feature of the invention is the provision on the sleeve 25 somewhat above the anchor 24 of a spring clip 40 pivotally held by a pin 41 which passes through the sleeve 25. This clip can receive the connecting rod 28, as shown in FIG. 2, when the latter is swung upwardly on the pivot bolt 29 to a position of near parallelism with the shaft 22. This forms a stowed position of the rod 28 and plate 33, allowing use of the shovel in a conventional manner without the aid of the invention should this be desired.

The use of the device in a unique mode of operation with minimized effort and fatigue is depicted in stages in FIGS. 7 through 11.

In FIG. 7, the shovel is positioned in a steeply inclined position to initiate digging with the tip of blade 21 on the ground surface and the foot plate 33 and connecting rod 28 trailing the blade 21. The cleat plate 34 and trailing end of plate 33 are also on the ground. The clevis 30 is in solid engagement with stop surface 32', and the rod 28 cannot swing further rearwardly on the lower pivot 31, although it is free to swing forwardly, as required.

The user then applies downward pressure along the axis of handle shaft 22 while simultaneously swinging the handle shaft downwardly vertically in the direction of the arrow in FIG. 7. This action causes the blade 21 to begin penetrating the ground and also forces the cleat 34 into the ground to resist rearward displacement of the foot plate 33 which now assumes a level position firmly against the ground surface. As continued pressure is applied to the shaft 22 coupled with rearward swinging in a vertical plane, the blade 21 penetrates the ground more deeply and advances forwardly toward the solid line position of FIG. 8 under influence of the rigid connecting rod 28 which swings forwardly and downwardly in the clockwise direction on the axis of pivot pin 31. Simultaneously, the upper pivot bolt 29 allows the handle shaft 22 to assume the new position shown in full lines in FIG. 8 nearly perpendicular to the connecting rod 28.

If need be, the initial penetration of the cleat plate 34 into the ground can be assisted by foot pressure on the plate 33 but this usually is not necessary. If a solid obstruction, such as a rock, is encountered in the described digging operation, the shovel can be retracted to a new starting position, such as shown in phantom lines in FIG. 8, at which time the connecting rod 28 can assume a rearward nearly upright position without disturbing the horizontal foot plate 33, by virtue of the two pivots 29 and 31 which are essential and critical to the more efficient mode of operation of the shovel or spade. Again, the rearward swing of rod 28 is limited by stop surface 32', as described.

FIG. 9 shows an intermediate operational position as where the user may wish to make a further and deeper penetration of the blade into the soil prior to lifting a shovel-full of soil. In FIG. 9, the shaft 22 has been lifted and swung to a more nearly upright position than in FIG. 8, followed by further downward pressure to force the blade 21 more deeply into the ground. Again, the connecting rod 28, by virtue of its two pivots 29 and 31, can assume the necessary positions without disturbing the foot plate 33 and its embedded cleat plate 34, which continues to resist any rearward movement along the ground surface. This is absolutely necessary to the proper operation of the shovel according to the present invention.

Finally, as shown in FIG. 10, the shovel can be operated in a lifting mode to remove and lift a full load of soil in a stable manner with very little human exertion in comparison to a comparable shovel without the present invention. In the lifting mode, again without disturbing the plate 33 which is in one fixed position throughout all stages of the operation, the handle shaft 22 is first swung downwardly in the direction of the arrow in FIG. 9 to a less steeply inclined position shown in full lines in FIG. 10. As this occurs, the rigid link 28 acting through its two pivots 29 and 31 will advance the blade 21 through the soil allowing it to scoop up the maximum load. This is followed by rearward pulling on the shaft 22 generally along its axis which swings the connecting rod 28 automatically to a near vertical position, thereby raising the shovel to an elevation well above ground level, as shown in phantom lines in FIG. 10, while the plate 33 remains undisturbed.

After emptying the load from the shovel blade 21, the above sequence of operations can be repeated. In essence, by virtue of the invention, the shovel operates in a forward "walking" mode without any reverse motion due to the holding action of the foot plate 33.

In addition to diverse digging and trenching uses substantially as described above, the device is also useful for cutting sod and for shoveling heavy aggregates, such as gravel 42, FIG. 11. When the aggregates are on a hard surface, such as pavement, the sharp teeth 35 of cleat plate 34 will bite and resist rearward movement. When the aggregates are on a softer surface, the cleat plate will penetrate as shown in phantom lines in FIG. 11.

In any case, the blade 21 can slide forwardly to engage beneath the gravel, followed by retraction and automatic lifting of the full shovel substantially in the manner depicted in phantom lines in FIG. 10. Again, the plate 33 remains fixed during the entire operation and the connecting rod 28 can adjust itself automatically by virtue of the two pivots 29 and 31 on parallel axes across the axis of the shaft 22. Also, the connecting rod 28 is positioned in a common vertical plane with the shaft 22 at all times. Whenever the handle shaft 22 is pulled rearwardly along its axis, FIG. 10, the rearward swinging of connecting rod 28 is arrested at a near upright position by action of the stop surface 32' on the lug 32.

I claim:

1. A tool for digging and lifting with reduced effort and fatigue comprising a shovel-like tool body having a forward blade and rearwardly extending handle shaft fixed to the blade, a foot plate spaced from the tool body and having a forward end depending cleat element adapted to penetrate the ground in response to downward pressure whereby the foot plate assumes a level position in contact with the ground surface and resists rearward displacement, a substantially rigid connecting rod interconnecting the tool body and foot plate and having a first pivotal connection with the tool body near and rearwardly of said blade and near the lower end of the handle shaft and a second pivotal connection with the foot plate near the forward end of the foot plate and near the plane defined by the foot plate, the axes of said pivotal connections being parallel and across the axis of said handle shaft of the tool body, and the handle shaft and connecting rod lying in a common vertical plane during normal use of the tool, said second pivotal connection further comprising an upwardly disposed body member secured to the foot plate and having a flat upper surface and an end member on said rod pivotally connected to said body member, said end member further having a flat lower surface located oppositely adjacent said upper surface and being operable to tilt into contact therewith at a predetermined point less than the upright position to stop the upwardly rearward swinging motion of said connected rod while freely permitting said connecting rod to swing forwardly on said stopping point.

2. A tool for digging and lifting as defined in claim 1, and holding means for the connecting rod on the handle shaft of the tool body enabling the connecting rod to be held in a stowed position beneath the handle shaft in general parallelism therewith.

3. A tool for digging and lifting as defined in claim 1, and the foot plate comprising a flat plate body, and said cleat element comprising a downturned plate extension on the forward end of the plate body across the axis of said handle shaft.

4. A tool for digging and lifting as defined in claim 3, and the downturned plate extension including sharp depending teeth at its lower end, and the plate extension and teeth being disposed at an acute angle to the foot plate of slightly less than 90°.

5. A tool for digging and lifting as defined in claim 1, and anchor elements fixed on the tool body and foot plate and parallel axis pivot pins defining the first and second pivotal connections held by the anchor elements and being pivotally engaged with opposite ends of said connecting rod.

6. A tool for digging and lifting as defined in claim 5, and the anchor element on the tool body being removably secured thereto.

7. A tool for digging and lifting as defined by claim 1 wherein said body member comprises a lug member, said end member comprises a bifurcated end member, and wherein said flat upper surface comprises an inclined surface on the upper forward portion of said lug member.

8. A tool for digging and lifting as defined by claim 7 wherein said stop occurs at an angle substantially less than the upright position.

9. A tool for digging and lifting as defined by claim 8 wherein said stop occurs at an angle of approximately 60° relative to the plane of the foot plate.

10. In a shovel or the like, a shovel blade and attached elongated handle shaft, a foot plate having a forward end cleat adapted to penetrate the ground in response to downward pressure, and a substantially rigid rod interconnecting the foot plate near its forward end with the handle shaft near and rearwardly of said blade, and means forming a first pivotal connection across the axis of the handle shaft between the upper end of the connecting rod and handle shaft and a second parallel axis pivotal connection between the lower end of the connecting rod and said foot plate, and the handle shaft and connecting rod being mutually swingable in a common plane relative to the foot plate, and positive stop means forming a part of the second pivotal connection limiting the upward movement of the connecting rod to a stop position substantially less than an upright position relative to the plane of the foot plate, said stop means comprising a pair of pivotally connected members having mutually opposing flat surfaces, one being fixed and the other being angularly rotated about a pivot of said second pivotal connection and which abut one another as the rod swings upwardly to the stop position.

* * * * *